United States Patent [19]
Woog

[11] Patent Number: 5,628,943
[45] Date of Patent: May 13, 1997

[54] METHOD OF MAKING RESIN KERNELS AND FOAM-LIKE MATERIAL CONTAINING REACTIVE MEDIA

[76] Inventor: Manfred J. Woog, 1040 Pershing St., Craig, Colo. 81625

[21] Appl. No.: 394,322

[22] Filed: Feb. 23, 1995

Related U.S. Application Data

[63] Continuation-in-part of Ser. No. 19,966, Feb. 19, 1993, abandoned, which is a continuation-in-part of Ser. No. 733,759, Jul. 23, 1991, abandoned, which is a continuation-in-part of Ser. No. 675,594, Mar. 27, 1991, abandoned.

[51] Int. Cl.$^6$ .................................................. B29C 44/12
[52] U.S. Cl. ............................ 264/45.3; 264/50; 264/51
[58] Field of Search ........................ 264/5, 50, 45.3, 264/41, 51

[56] References Cited

U.S. PATENT DOCUMENTS

| | | |
|---|---|---|
| 3,061,885 | 11/1962 | Rogers, Jr. et al. . |
| 3,103,408 | 9/1963 | Chen et al. . |
| 3,376,366 | 4/1968 | Clark . |
| 3,472,801 | 10/1969 | Lerman et al. . |
| 3,499,837 | 3/1970 | Jaunarais . |
| 3,953,360 | 4/1976 | Morishita et al. . |
| 4,224,374 | 9/1980 | Priest . |
| 4,323,656 | 4/1982 | Strickman et al. ............ 521/109 |
| 4,339,337 | 7/1982 | Tricot et al. . |
| 4,350,504 | 9/1982 | Diachuk . |
| 4,443,339 | 4/1984 | Rosevear . |
| 4,443,391 | 4/1984 | Melchior . |
| 4,548,954 | 10/1985 | Smith et al. . |
| 4,551,482 | 11/1985 | Tschang et al. . |
| 4,645,630 | 2/1987 | Rasshofer et al. . |
| 4,659,477 | 4/1987 | Macedo et al. . |
| 4,662,613 | 5/1987 | Woog . |
| 4,818,453 | 4/1989 | Inoue et al. ...................... 264/41 |
| 4,855,052 | 8/1989 | Reishl . |
| 4,871,782 | 10/1989 | Modic et al. ..................... 521/88 |
| 4,919,866 | 4/1990 | Kubbutat ........................ 264/45.3 |
| 4,931,236 | 6/1990 | Hettinga . |
| 4,988,448 | 1/1991 | Woog . |

FOREIGN PATENT DOCUMENTS

| | | |
|---|---|---|
| 2053705 | 5/1972 | Germany . |
| 47-51938 | 12/1972 | Japan . |
| 54-4910 | 1/1979 | Japan . |
| 54-111586 | 8/1979 | Japan . |
| 59-196227 | 11/1984 | Japan . |

*Primary Examiner*—Allan R. Kuhns
*Attorney, Agent, or Firm*—Arnold B. Silverman; Diane R. Meyers; Eckert Seamans Cherin & Mellott

[57] ABSTRACT

A porous substance containing a reactive material and the related method for making the substance is provided. The method includes establishing a thermosetting resin substance which is porous and inert to liquids in a vessel. The resin substance may then be impregnated with finer particles of a reactive material or chemicals. The reactive material is chosen such that an ionic exchange or catalytic reaction will occur when a liquid to be treated is passed through the kernels. After the reactive material is added to the resin substance, the resulting resin substance is cured by heating or by the addition of a catalyst or a combination thereof. Kernels may be formed from the thermosetting resin substance which have a sponge-like configuration and which contain the reactive particles within the supporting resin substance. Air, gases and solutions may be passed through the kernels for filtration, purification, or reactive purposes. Alternatively, the substance can be poured into a treatment vessel while still in liquid form and it is then allowed to cure in situ.

11 Claims, 1 Drawing Sheet

METHOD OF MAKING RESIN KERNELS AND FOAM-LIKE MATERIAL CONTAINING REACTIVE MEDIA

CROSS REFERENCE TO RELATED APPLICATIONS

This application is a continuation-in-part of application Ser. No. 08/019,966 filed on Feb. 19, 1993 (now abandoned), which is a continuation-in-part of application Ser. No. 07/733,759 filed on Jul. 23, 1991 (now abandoned) which is a continuation-in-part of application Ser. No. 07/675,594, filed on Mar. 27, 1991 (now abandoned) for RESIN KERNELS CONTAINING REACTIVE MEDIA AND METHOD FOR MAKING SAME.

BACKGROUND OF THE INVENTION

1. Field of The Invention

This invention relates to a resinous foam-like material which may be formed into resin kernels. The thermosetting resin material may contain a reactive media that will treat liquid, air or gases. This can happen by purification or ionic or catalytic exchange of chemicals when a liquid, air or gas flows through the foam-like material. In another example, the foam-like material can become the structural host for bacteria and thereby become a biological reactor for removing toxic substances such as ammonia from marine water sources. A related method of making the resinous foam-like material is also disclosed.

2. Background Information and Description of the Prior Art

It has become increasingly important in today's commercial and industrial society to develop efficient methods and devices for purifying liquids and for reclaiming useful products from liquids which may have been used in another chemical reaction. The need for purification of liquids has become more substantial due to stringent environmental standards. There is a great necessity for inexpensive and commercially viable methods of purifying liquids and reclaiming useful substances from liquids in the current environmentally-conscious and cost-conscious business climate. A need arises for providing superior economical and efficient ionic reactive media for use in ionic exchange reactions for reclaiming products such as minerals, organic substances and the like from a solution which may have been used for another purpose. In addition, there is a need for simple, easy-to-use methods of purification of liquids, such as water or chemicals, which are to be discharged into effluent water supplies. In summary, there are many circumstances in which a liquid is to be treated by reaction with a particular chemical or bacteria for such purposes and others.

One example of a method of reclaiming precious metals is set forth in U.S. Pat. No. 4,662,613 owned by the inventor of the present invention. U.S. Pat. No. 4,662,613 discloses a reusable precious metal recovery cartridge. The cartridge contains a spiral rolled exchange mass which contains fine particles of a replacement metal of higher electromotive force than the metal to be recovered. The cartridge is particularly useful for reclaiming silver from spent photographic chemical solutions. The spent photographic solutions are sent through the cartridge and the silver is replaced by iron which is contained in the spiral exchange mass. The silver is later reclaimed from the cartridge for other uses. Although the cartridge has many advantages, it is a fixed size and configuration. This means that it cannot be used in a non-conforming configuration which may be preferred or required in a particular application. There remains a need for a method and apparatus for performing ionic exchange reactions which is not dependent upon the particular size of a conduit or vessel. In addition, there remains a need for providing a foam-like material which will harden in situ or small kernels of the foam-like material which can be used with a container of any desired configuration.

An example of one method of purification of liquids is set forth in U.S. Pat. No. 4,988,448 (owned by the inventor of the present invention) which discloses a method for removing substances from a solution. The method relates to the use of an activated carbon absorption chamber onto which chemicals such as ammonia and hydroquinone will adsorb and thus be removed from the liquid being treated. These chemicals may be hazardous to health and the environment. It is desirable to remove or minimize such substances prior to discharge of the solution into the environment. The system, however, also uses a vessel having a fixed configuration.

Particles of polyurethane which contain biologically active materials were disclosed in U.S. Pat. No. 4,855,052. These particles can be used as carriers in microbic synthesis processes for the production of complicated organic compounds and as special carriers for the growth of plants. These particles are highly water absorbent.

Selective adsorbing particles were disclosed in U.S. Pat. No. 3,953,360. The particles are formed by creating a dispersion of activated charcoal in a hydrophilic solvent solution. The particles are useful with various organic compounds such as antibiotics, dyestuffs, nucleic acids, proteins and enzymes.

U.S. Pat. No. 3,499,837 discloses a method of removing phosphate from waste water by contacting the waste water with a water-insoluble composition comprising hydrous iron oxide coated on a particulate support.

Magnetic beads of vinyl aromatic polymers were disclosed in U.S. Pat. No. 4,339,337. The beads are useful in paints, inks, reprography and in biology.

A composite material composed of a support material with a permeable gel retainer on the support material was disclosed in U.S. Pat. No. 4,443,339. The permeable gel contains an active material capable of retaining a chemical species from a fluid substance.

A method for removing radioactive iodine from liquid and gaseous waste streams using a silicate or charcoal member containing heavy metal cations was disclosed in U.S. Pat. No. 4,659,477.

U.S. Pat. No. 4,548,954 discloses an oil absorbent floor cleaning composition which involves use of a foam substance which includes detergents and an organic solvent.

However, there remains a need for a thermosetting resin substance with reactive media impregnated therein in kernel form or formed in larger particles which are capable of forming an open cellular sponge which can be used to filter, purify or chemically alter a liquid to be treated. There also remains a need for a simple, low cost substance which is easy to use, and which can be utilized with a container or vessel of any size or configuration.

SUMMARY OF THE INVENTION

These and other needs have been satisfied by the composition and method of the present invention which provides a thermosetting resin substance which is capable of forming an open cellular structural sponge. The sponge material is initially a foam-like material which later hardens. The hardened material may be formed into kernels. It is inert to liquids, yet pervious to them. The sponge may be saturated or impregnated with a second substance which is a reactive substance which will cause the desired purification or exchange reaction when the liquid, air or gases to be purified is passed through the open cellular sponge structure after the sponge with the active material impregnated inside has been cured.

The method of making the kernels includes establishing a thermosetting resin substance porous to liquids in a vessel. The method thereafter includes impregnating that thermosetting resin substance with a reactive material by mixing the reactive material with the resin substance to create a mixture. The thermosetting resin substance with the reactive media impregnated inside is then cured, either by heating or by the addition of a catalyst or a combination thereof. The method may also include adding a foaming agent to the mixture by forcing air or other gases, for example, into the mixture to further generate formation of the sponge-like configuration. An additional step may be performed to obtain a plurality of kernels having a diameter preferred in the particular application. One example of the kernel size is a diameter of between about $3/160$ to $1/8$ inches. However, it should be understood that kernels of any suitable dimensions can be formed. In addition, the kernels may be of a microencapsulated size on the order of 0.1 millimeter in diameter. Alternatively, the resulting mixture can be placed in a container as a liquid and it will later cure and harden in situ. The liquid to be treated can then be passed through the container holding the cured mixture.

The resin substance may be selected from the group consisting of silicone resin, phenol formaldehyde resin, polyurea melamine and epoxy resin or combinations thereof. Silica may also be added to one of the other compounds being used as the resin substance to promote a reclamation process as discussed hereinafter. The reactive material can be any material which will produce the desired purifying reaction. For example, a ferrous iron powder could be mixed into the resin substance and used to reclaim silver from a suitable liquid being treated. Alternatively, activated carbon can be used as a reactive substance with which the resin material is impregnated and this can be used to adsorb certain organic substances such as ammonia and hydroquinone in order to purify a liquid prior to discharge of that liquid into effluent water supplies.

The reactive substance may be composed of indiscriminate particles having a size perhaps of between about 4 to 200 mesh.

The thermosetting resin substance thus impregnated with the activated material can then be used in any vessel of any configuration such as a square vessel having an inlet and an outlet conduit into which liquid is introduced and then forced through the cured mixture of the present invention thereby setting up the exchange reaction as desired in the application.

It is an object of the present invention to provide a system which efficiently removes certain chemicals from a solution before the solution is discarded.

It is another object of the invention to provide a system which efficiently alter certain chemicals, metals or constituents from a solution, air or gas.

It is another object of the invention to provide a system which is capable of removing hazardous or environmentally unacceptable chemicals from a solution.

It is another object of the invention to provide a kernel which can be impregnated with any reactive material so that the desired exchange reaction using the kernel is achieved.

It is another object of the invention to provide a system which allows reclaiming or recovery of certain metals which may be within the solution to be treated.

It is a further object of the invention to provide a system which can be used in a vessel of any configuration of any size.

It is yet a further object of the invention to provide a substance which is economical and easy to use.

These and other objects of the invention will be more fully understood from the following description of the invention with reference to the illustrations appended hereto.

DESCRIPTION OF THE PREFERRED EMBODIMENTS

For convenience of disclosure, the invention is described with reference to FIGS. 1 and 2 which show kernels of the material of the present invention. It should be understood, however, that the material does not have to be formed into kernels, instead it may be placed in liquid form in a container and it will later harden in situ.

Figure 1:
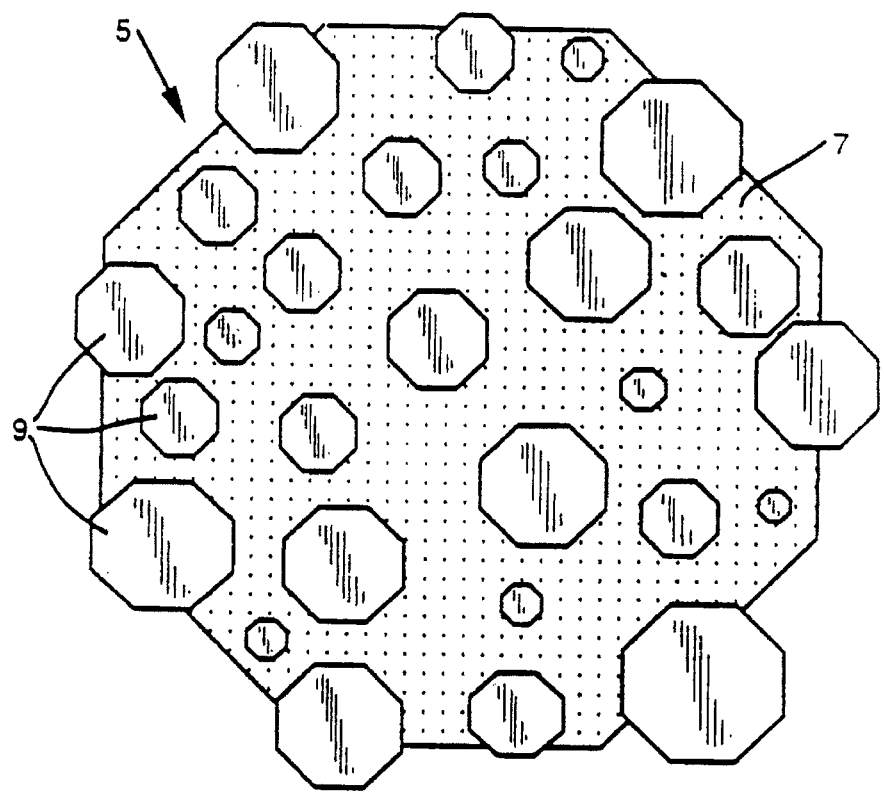
FIG. 1 is a schematic cross-sectional illustration of one kernel in accordance with the present invention.

Referring to FIG. 1, a resin kernel in accordance with the present invention is shown. Resin kernel 5 is comprised of a sponge-like resin substance 7 which is preferably selected from the group consisting of silicone resin, phenol formaldehyde resin, polyurea melamine and epoxy resin or combinations thereof. Silica may also be added to one of the other resin substances to promote a reclamation process as discussed hereinafter.

Resin substance 7 is of an open cellular sponge-like configuration thus allowing the passage of a liquid to be purified or filtered therethrough. Resin substance 7 is impregnated with particles such as finer particles 9 which comprise a reactive media which is chosen such that the media will promote the purifying or filtering reaction desired for the application in which kernels 5 or the solid form, as the case may be, in which the substance of the present invention is to be used. It is preferred to provide particles 9 selected from the group consisting of activated carbon, ferrous sponge iron, ferrous elemental iron powder and zeolites, such as natural or artificial zeolite substances containing hydrogenated silicate of aluminum which are capable of ion exchange with solutions. For example, zeolites may be employed for cationic reaction exchanging sodium for calcium or removal of forms of nitrogen. It should be understood that other reactive media may also be chosen while remaining within the scope of the present invention. For example, bromedia for biological reaction may be employed in the conversion of ammonias to nitrites and conversion from the nitrites to nitrates. A solution is treated by being forced to flow through kernels such as kernel 5 and the reactive material 9 will cause the desired ion exchange reaction or purification reaction or treatment reaction. Alternatively, the material of the present invention can be prepared without the addition of the reactive media if only a filtering or a biological process is desired.

In accordance with the method of the present invention, a resin substance 7 which is porous to liquids and inert to the liquid to be used in a particular application, is established in a reaction vessel. This resin substance 7 is then impregnated with a reactive material 9 which comprises small particles of between about 4 to 200 mesh. This can occur by mixing the two substances in a reaction vessel and agitating the mixture until complete mixing occurs. The reactive particles will be evenly dispersed throughout the thermosetting resin substance as a result of the mixing step. Either at the same time as the reactive material is added to the resin substance 7 or immediately thereafter, a curing procedure is performed in order to entrap reactive material 9 in sponge-like kernels 5. A preferred form of curing the mixture is to heat the mixture to a temperature between about 45° and 110° C. for about 2 to 60 seconds depending on the quantity of the mixture. Alternatively or additionally, curing may be accomplished by adding a catalyst to the mixture. A preferred catalyst is preferably selected from the group consisting of toluenesulfonic acid, benzenesulfonic acid and sulfuric acid. The catalyst is used to promote the curing reaction with less heating and promote more cellular structure. For example, it may be undesirable to heat certain substances and, in such cases, a catalyst is preferable. Another example is in the case where the inert kernels which do not contain a reactive media are prepared.

Curing is performed to achieve a plurality of kernels 5 having reactive particle 9 therein, which kernels 5 may have an average diameter per kernel of between about 3/16 to 1/8 inches. During the curing process, it is also preferred to force air or other gases into the mixture in order to promote formation of the sponge-like configuration of the kernel 5. In addition, heated air can be used to provide the temperature increase for the heating step of the process.

This creates a plurality of sponge-like kernels which are pervious and permeable to liquids. However, the reactive material 9 contained within each impregnated kernel will cause a change in the liquid as desired in the application. For example, if the reactive particles 9 impregnated into the sponge-like material are activated carbon, then the kernels 5 can be used for adsorbing onto the carbon harmful substances such as ammonia or hydroquinone which may be desired to be removed from a solution that is being purified. An example of types of solutions with which such removal is required are spent photographic chemicals. It is desirable to remove the ammonia and hydroquinone from such solutions prior to discharge of the solution into efficient water supplies.

As an alternative aspect of the method, after the resin substance and the reactive media are heated and mixed, and just before the curing step has been performed a foaming agent is added. The foaming agent may be hot air or some other type of gas or substance. Now a catalyst may be added and mixed in, the material then further foams up. This step is performed immediately prior to pouring the mixture into a suitable container. It is preferred to use this step if the mixture is particularly dense, such as may occur when iron is used as the reactive media. It thereafter cures into a rigid open cellular sponge material. If kernels are desired instead of the solid singular configuration, the above formed material can be granulated and screened to its desirable dimensions. Alternatively before it cures, kernels can be created by aspirating the mixture into a large silo with hot air pressure and allowing it to cure in suspension or pouring it onto a heated conveyor belt and within about 30 seconds to 1 minute it will be expanded and cured. Rollers can then be used to crack or crush the material into a more preferred size and shaped kernels. It is also preferred to provide an inert screen or batten material over the bottom of inlet 19 and bottom of outlet 25 so as to prevent the kernels from escaping.

In addition, it may be preferred to provide a salt such as sodium sulfate to the mixture which provides for a greater amount of available surface area for the liquid to interact with the reactive media.

Another example of the reactive material 9 is ferrous elemental iron. Kernels impregnated with ferrous iron can be used for ionic exchange reactions. For example, if spent photographic chemicals are sent through the kernels 5, the iron will exchange with silver contained within the solution and silver can be captured whereas iron will replace the silver in the liquid. The silver can be reclaimed from the kernels by direct smelting.

By way of further example, natural zeolites such as stilbite, natrolite and other natural zeolites may be used to remove ammonia, calcium or magnesium from a liquid, as desired. Alternatively, an artificial zeolite may be used.

EXAMPLE I

About 100 grams of phenol formaldehyde resin heated approximately to 120 degrees F. were placed in a reaction vessel. A reactive material comprising ferrous sponge iron, was then mixed into the resin substance. About 70 grams of ferrous iron particles heated to the same temperature having a size of about 30–200 mesh were used. The ferrous iron and the phenol formaldehyde resin were quickly mixed and agitated to obtain a fine dispersion of the reactive material within the resin. Approximately 10 milliliters of toluenesulfonic acid was mixed in, the mixture then proceeded to foam up and cure and the rigid open cellular iron sponge material was ready for use in the desired application.

Figure 2:
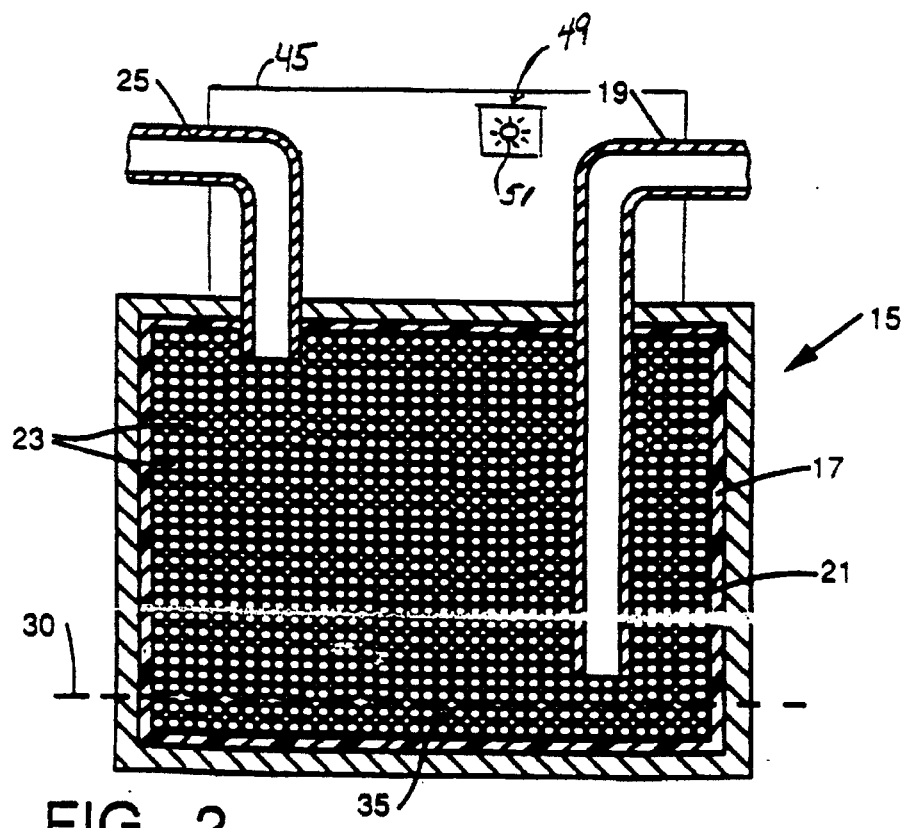
FIG. 2 is a schematic cross-sectional illustration of a vessel containing the kernels of the present invention.

Referring to FIG. 2, one use of the kernels 5 of the present invention is shown. For example, a reaction vessel 15 may include an internal deformable bladder-type plastic bag 17 for retaining liquids therein. Vessel 15 has an inlet conduit 19 into which a liquid is introduced into the inner chamber 21 of vessel 15. A plurality of kernels 23 are prepared in accordance with the present invention and are placed within chamber 21 of vessel 15. When the liquid to be treated is introduced into inlet 19 it then passes through the reactive media created by the plurality of kernels 23 and the desired reaction in the application occurs. Outlet conduit 25 provides the discharge conduit for passing the liquid out of vessel 15.

It is preferred to provide a bottom layer of inert kernels 35 which are schematically illustrated in FIG. 2 as those appearing under dashed line 30. The inert kernels 35 do not contain a reactive media. These kernels 35 serve to distribute the liquid evenly before it begins to percolate up through vessel 15 and into the active kernels 23.

It is also preferred to provide a inert screen or batten material over the bottom of inlet 19 and bottom of outlet 25 so as to prevent the kernels from escaping.

It is also preferred to provide extension 45 in vessel 15 to house inlet conduit 19 and second outlet conduit 25. Within extension member 45, a sensor 49 is placed. This sensor may be either a device which senses electrical resistance or a pressure sensor. Preferable, it is a resistive sensor. The sensor 49 can be used to determine whether the liquid level in the vessel 15 is too high. The sensor 49 may also include an alarm or indicator light 51 to indicate to a user that the vessel 15 is full or exhausted and that no additional liquid should be added. It is also preferred to provide quick disconnect fixtures to inlet conduit 19 and outlet conduit 25 as would be readily available to those skilled in the art.

It should be understood that vessel 15 is one type of vessel with which the kernels 23 of the present invention can be used, however, any other vessel of essentially any configuration can be used for treating a liquid using kernels of the present invention. This is an advantage of the present invention in that the kernels can be poured into a chamber of any size or configuration and utilized in the application which may be desired. As noted hereinbefore, the material can alternatively be poured into a vessel as a liquid and then allowed to cure in situ.

It should be understood that while several examples have been given for the uses with which the kernels of the present invention can be made, many other uses involving any treatment of a liquid in order to remove substances or replace substances or any ionic exchange, catalytic or biological reaction can be utilized depending upon the reactive material which is established within the sponge-like kernels.

Whereas particular embodiments of the invention have been described hereinbefore for purposes of illustration, it will be appreciated by those skilled in the art that numerous variations of the details may be made without departing from the invention as described in the appended claims.

What is claimed is:

1. A method of making resin kernels, including the steps of establishing in a vessel a thermosetting resin substance which is porous to liquids;

impregnating said resin substance with a reactive material by mixing said reactive material with said resin substance to create a mixture;

curing said resin substance with said reactive material contained therein to form kernels having a sponge-like configuration;

foaming and curing said resin substance by adding a catalyst substance thereto; and adding as said catalyst a material selected from the group consisting of toluenesulfonic acid, benzenesulfonic acid and sulfuric acid.

2. The method of claim 1 also including forcing a gaseous substance into said mixture to further generate formation of said sponge-like configuration of said kernels.

3. The method of claim 1 including curing said resin substance by heating to a temperature of between about 45° and 110° C.

4. The method of claim 3 including foaming and curing said resin substance by heating and by forcing heated air into said mixture.

5. The method of claim 1 including curing said resin substance to achieve a particle diameter of about 3/16 to 1/8 inches.

6. A method of making resin kernels, including the steps of establishing in a vessel a thermosetting resin substance which is porous to liquids;

impregnating said resin substance with a reactive material by mixing said reactive material with said resin substance to create a mixture;

curing said resin substance with said reactive material contained therein to form kernels having a sponge-like configuration; and selecting said resin substance from the group consisting of silicone resin, phenol formaldehyde resin, polyurea melamine and epoxy resin and combinations thereof.

7. The method of claim 6 also including adding silica to said resin substance.

8. The method of claim 6 including selecting said reactive material from the group consisting of activated carbon, ferrous sponge iron, ferrous elemental iron, natural zeolites and artificial zeolites.

9. A method of making a material for treating liquids, including the steps of establishing in a vessel a thermosetting resin substance capable of being porous to liquids;

mixing with said resin substance a reactive material;

adding a foam-generating substance to said mixture;

immediately pouring said mixture containing said foam-generating substance into a second treatment vessel;

agitating said mixture when said reactive material is adding to said resin substance;

selecting said resin substance from the group consisting of silicone resin, phenol formaldehyde resin, polyurea melamine resin and combinations thereof;

selecting said reactive media from the group consisting of activated carbon, ferrous sponge iron, ferrous elemental iron, natural zeolites and artificial zeolites; and either aspirating said mixture containing said foam generating substance into a silo vessel with hot air pressure and allowing it to cure; or pouring it onto a surface, allowing said mixture to cure, and cracking said cured material into individual kernels prior to adding said kernels to a second treatment vessel.

10. The method of claim 9 including adding a salt to said mixture after said resin substance is mixed with said reactive media.

11. The method of claim 10 including selecting sodium sulfate as said salt.

* * * * *